United States Patent [19]
Smith et al.

[11] Patent Number: 5,527,400
[45] Date of Patent: Jun. 18, 1996

[54] METHOD AND APPARATUS FOR MACHINING HARDENED PARTS APPARATUS FOR MACHINING HARDENED PARTS

[75] Inventors: Roland C. Smith, Milford; James S. Fisher, Huntertown, both of Ind.

[73] Assignee: Dana Corporation, Toledo, Ohio

[21] Appl. No.: 337,969

[22] Filed: Nov. 14, 1994

Related U.S. Application Data

[63] Continuation of Ser. No. 116,473, Sep. 7, 1993, abandoned.

[51] Int. Cl.$^6$ .................................... B23B 23/02
[52] U.S. Cl. .................. 148/537; 148/586; 148/649; 82/142; 82/147; 82/150; 82/165
[58] Field of Search ..................... 148/537, 586, 148/649; 82/142, 147, 150, 165

[56] References Cited

U.S. PATENT DOCUMENTS

| | | | |
|---|---|---|---|
| 474,265 | 1/1892 | Roe | 82/150 |
| 1,252,274 | 1/1918 | Lingo | 82/150 |
| 1,600,534 | 9/1926 | Carr | 82/150 |
| 1,878,690 | 9/1932 | Forney | 82/150 |
| 1,956,305 | 1/1934 | Baninger | 82/33 |
| 2,353,009 | 7/1944 | Boyd | 82/33 |
| 2,397,371 | 3/1946 | Reynolds | 82/33 |
| 3,618,434 | 11/1971 | Nault | 82/45 |
| 3,937,111 | 2/1976 | Holloway | 82/33 |
| 4,075,915 | 2/1978 | Williams | 82/33 |
| 4,677,885 | 7/1987 | Schmid et al. | 82/40 R |
| 5,181,441 | 1/1993 | Okada | 82/142 |

*Primary Examiner*—George Wyszomierski
*Attorney, Agent, or Firm*—Oldham & Oldham Co.

[57] ABSTRACT

A method and apparatus for machining a workpiece from a hardened unmachined part includes the use of non-rotating centers in a turning machine, on which the workpiece is mounted. The shape of the dead centers permits less force to be used in support of the workpiece for reducing friction between the rotating workpiece and non-rotating centers, while exerting a maximum amount of radial holding force to reduce runout in the machining operation. Lubrication can be supplied through the dead centers to further reduce friction and/or an anti-friction coating may be applied to the contacting surface of the centers for this purpose. Machining of the hardened part may be controlled by CNC equipment.

10 Claims, 2 Drawing Sheets

METHOD AND APPARATUS FOR MACHINING HARDENED PARTS APPARATUS FOR MACHINING HARDENED PARTS

This is a continuation of application Ser. No. 08/116,473 filed on Sep. 7, 1993, abandoned.

BACKGROUND OF THE INVENTION

This invention generally relates to a method of machining a part using a turning machine having non-rotating locating centers for support of a part to be machined thereon. More particularly, the invention relates to a method and apparatus for machining a hardened part, the hardened part being mounted on non-rotating locating centers to reduce runout of the machined part.

A wide variety of mechanical parts are initially forged from a steel or like material in an unmachined configuration, and thereafter the forged part is machined to a final configuration for use. Conventionally, a part is machined prior to subjecting the part to a heat-treatment stage for hardening of the part to extend its useful life and function for which the part was made. In these cases, a conventional approach was to machine a conical center bore in the initially forged unmachined configuration, the center bore receiving a tool center for mounting of the part on locating centers of a turning machine or lathe. The locating centers are then conventionally turned at high speed for rotation of the part. Subsequent to this, in order to reduce cost of a part, the unmachined part was forged with a conical center bore for receiving the locating centers. Upon subsequent machining, it has been found that holding very exacting tolerances on a machined part is difficult due to imperfect machined or forged center bores in a part, which may result in wobbling of the part upon turning in the machining process. Various methods and constructions have been proposed to increase the accuracy of the machining process and to avoid the difficulties of imperfect conical center bores used to mount a part to be machined. Particularly, the configuration of the center bore may allow an unmachined part to adjust for distortions occurring in the center bore.

Although the configuration of the center bore forged or machined into a part can facilitate machining with high accuracy, it has been found that the turning machine or lathe used in machining of a part itself may contribute to unacceptable inaccuracies in a final machined part. Typically, a lathe or turning machine will include live centers which are turned within a bearing set. These live centers support a workpiece for rotation about an axis, and are fixed to the workpiece and driven about the axis to cause the workpiece to rotate. Such live centers contribute to excessive runout in a finely-machined part, caused by the bearing set supporting the rotating machine center. These runout errors increase upon continued use of the turning machine with continued wear of the bearings supporting the lathe center. For example, after a turning machining or lathe has been used for a period of time, the minimum amount of runout achievable has been found to be approximately 0.002 to 0.003. In complex machined parts, such as hypoid gear sets, it is desired to hold tolerances of a final machined part to 0.001 for example. Typically, the fabrication of a final part will include machining of an untreated forged part which will then be subjected to a heat treatment process for hardening of the material. Subsequent to heat treatment, an attempt to straighten the part will result in bending of further runout into a part instead of the desired straightening, particularly if initial runout in the machined part is greater than required tolerances.

It has also been found that the step of heat treating a machined part subsequent to the machining process may induce additional errors resulting in unacceptable part quality. It would therefore be desirable to perform heat treating or hardening of the part prior to machining to avoid such errors. Conventionally, after a hardening process is performed, any finish machining of a part required grinding on a grinding machine, as tooling for machining a hardened part on a turning machine or lathe was not available. Upon the development of tooling such as ceramic or cubic boron nitride cutting tools in use with a turning machine, it is now possible to turn hardened parts accordingly. Turning of hardened parts reduces cost as compared to grinding of hard parts, and therefore would be desirable if problems with induced runout as noted above can be overcome.

SUMMARY OF THE INVENTION

Based upon the foregoing, the present invention describes a turning machine for producing a machined part with runout errors being minimized. There is also described a method of machining a hardened workpiece in a turning process. The apparatus includes a pair of non-rotating or dead centers for supporting a workpiece along an axis. The centers are formed with a predetermined curved outer surface, a portion of which engages the center recesses formed in the ends of the workpiece in a predetermined manner to exert a large radial holding force and yet reduce frictional heating. A passageway may extend through the centers to the nose, through which a lubricant can be passed to further reduce frictional heating. Alternatively, the centers may be provided with an anti-friction coating. The apparatus further includes means to rotate the workpiece at a predetermined speed to allow machining thereof.

There is also disclosed a method of forming a part by a machining process which comprises the steps of forming a workpiece from a predetermined material, the workpiece having two ends with center, specially-shaped unmachined recesses therein. The recesses receive non-rotating tool centers of a turning machine. The workpiece is thereafter subjected to a hardening process, and is mounted on the locating centers of the turning machine via the recesses therein. The workpiece is thereafter rotated at a predetermined speed about an axis on the non-rotating tool centers, and machining is performed to fabricate a finished part.

BRIEF DESCRIPTION OF THE DRAWINGS

The objects and features of the present invention will be best understood from a reading of the following detailed description in conjunction with the drawings, wherein.

DETAILED DESCRIPTION OF THE INVENTION

Figure 1:
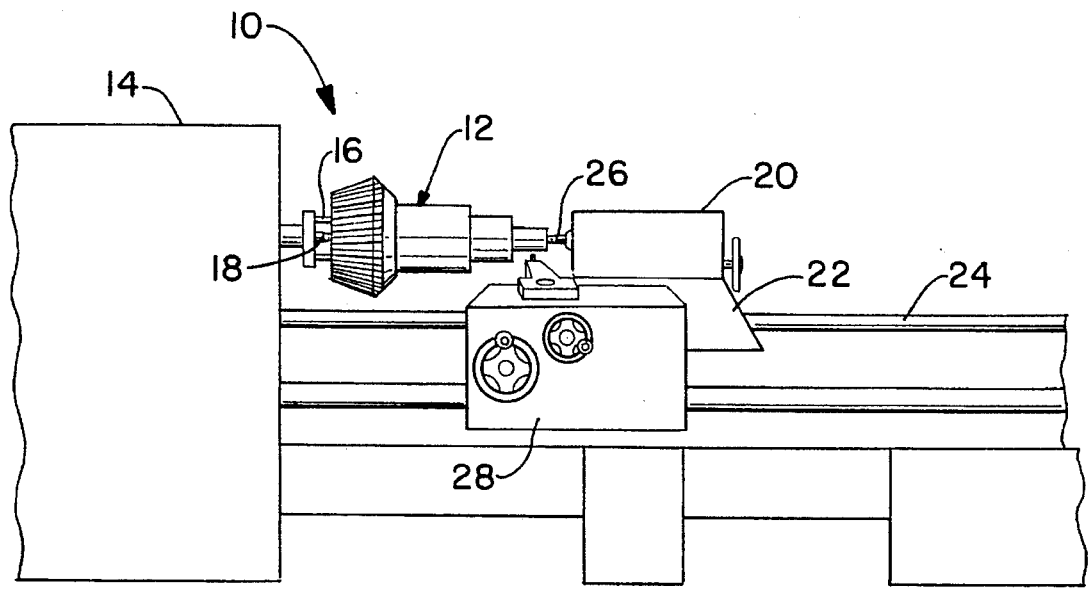
FIG. 1 is a side elevational view of a turning machine in accordance with the invention.
Figure 2:
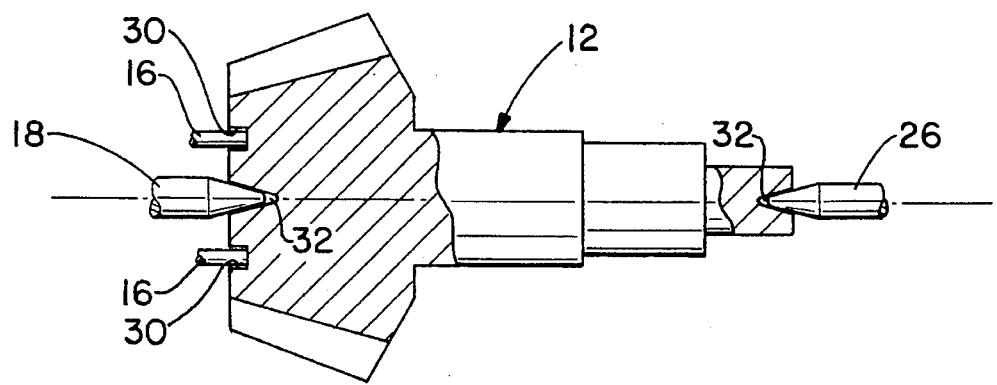
FIG. 2 is an enlarged partial view of the locating centers and workpiece as shown in FIG. 1.

A turning machine 10 for machining a workpiece 12 is illustrated in FIGS. 1 and 2. The workpiece 12 is fabricated by forging or other suitable technique. As an example, the workpiece 12 is formed of steel which has been subjected to a heat-treatment process for hardening of the material to a desired hardness, but can also be a green part which has not been hardened. The turning machine or lathe 10 generally includes a headstock 14 which carries means for driving a workpiece such as outboard spindle drive pins 16 situated about a locating center 18. The apparatus further includes a tailstock 20 mounted on an axially-movable carriage 22 which moves within hardened ways 24 to accommodate different sized workpieces 12. A further locating center 26 is supported on tailstock 20, and with center 18 is used to mount workpiece 12 therebetween. A rest and tool locator 28 may be used in machining of workpiece 12 using a cutting tool (not shown) while the workpiece 12 is rotated at a high speed.

To machine a workpiece 12 with high accuracy to form a final part within predetermined tolerances, the workpiece 12 is mounted on centers 18 and 26, which are specially designed to greatly reduce runout in a machined part. The drive pins 16 engage drive apertures 30 formed in the workpiece 12 to rotate the part, or other suitable drives may be provided. The workpiece 12 further includes a center bore 32 at each end thereof, into which the centers 18 and 26 are positioned to support the workpiece. The center bores 32 formed in the workpiece 12 may have side walls provided with a predetermined radius, straight sidewalls or be of a tri-lobed configuration. The centers 18 and 26 are formed of a plain grade carbide steel, and when inserted into the recesses 32 formed in the workpiece 12 exert a predetermined amount of radial holding force on the workpiece 12.

Figure 3:
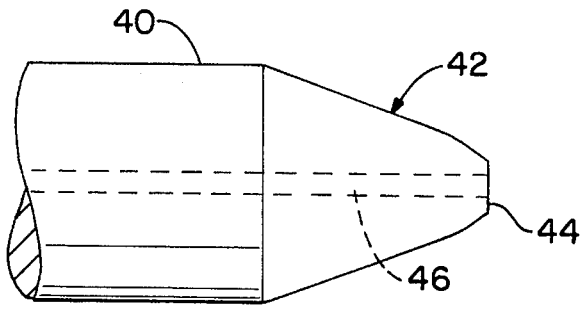
FIG. 3 shows a locating center in accordance with the invention.
Figure 5:
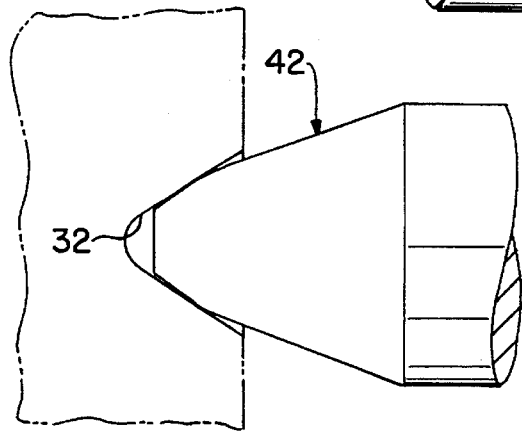
FIG. 5 shows the locating center positioned within a center recess of a workpiece.

The locating centers 18 and 26 are formed as dead centers which do not rotate with the workpiece during the machining process, but instead are fixed in position and provide the support on which the workpiece 12 is rotated. As the workpiece 12 is normally rotated at high speeds exceeding 1000 rpm, the use of dead centers on the, turning machine 10 requires reduction of friction between the workpiece center bore 32 and centers 18 and 26 to avoid friction welding of the dead centers 18 and 26. Centers conventionally used in lathes having live centers are designed to fit a standard conical recess in the workpiece wherein the recess has an included angle of 60°. In the use of dead centers 18 and 26, it has been found that the shape of the outer surface is important to achieve reduced runout of the workpiece while avoiding excessive heating or frictional welding. As shown in FIG. 3, the dead center 18 or 26 is formed with a cylindrical shank 40 and an outer surface 42 having a curved, frusto-conical shape having an included angle in the range of 30° to 50°, with an included angle of 40° giving best results. The positioning of centers 18 or 26 in a central bore of a part is shown in FIG. 5. This shape and contact angle exerts a large radial holding force on the workpiece to reduce axial runout by maintaining true running alignment of the center in the workpiece under all conditions. Forming the contact surface 42 in this manner also allows proper support of the workpiece with less force to reduce frictional heating occurring upon rotation of the workpiece. As seen in FIG. 5, the contact of the center 18 or 26 in a recess having an included angle in the range between 60° to 75°, with an included angle of 67° preferred, results in greatly reduced frictional heating while supporting the part in a manner to minimize axial runout in machining. The center also allows minimal supporting force on the tailstock of the turning machine, with good results obtained using as little as 160 to 200 pounds of force.

This locating center configuration has produced excellent results without lubrication between the center and the bore of the part, but lubrication may be desirable to further reduce frictional heating. As seen in FIG. 3, the center may include a central passageway 46 extending through the body of the center and leading to the nose portion 44. The passageway 46 is coupled to a supply of lubricant which is introduced into the central bore of a part between the center 18 or 26 provide lubricant to the contact surface 42 of the center.

Figure 4:
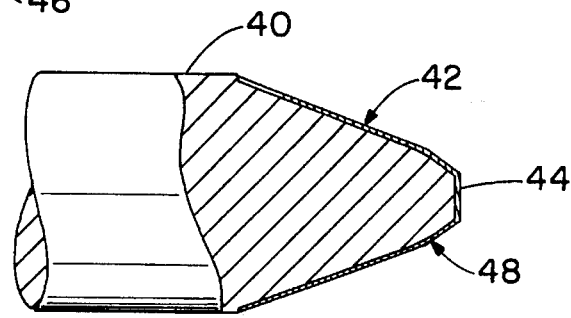
FIG. 4 shows an alternate embodiment of the locating center.

In an alternative embodiment, the center 18 or 26 may be provided with a hard, anti-friction coating 48 as shown in FIG. 4. The coating 48 may be of any desired thickness depending upon the type of workpieces to be used therewith, and may be provided on the surface by any conventional coating method. A titanium or moly sulfide coating is suitable for the anti-friction coating 48, and may be used to further reduce frictional heating of the non-rotating center alone or in combination with lubrication as previously described.

A method of machining a hardened workpiece includes the step of forming an unmachined workpiece from a material selected according to its final use. For a drive pinion gear, an example of a material conventionally used is SAE8620 steel. The unmachined workpiece is initially forged with two ends, each having a central bore such as a tri-lobe bore as shown in U.S. Pat. No. 5,135,810. The central bores receive the non-rotating locating centers of the turning machine. The workpiece may optionally be subjected to an annealing process, such as an isothermic atmospheric annealing process. In such a process, the workpiece is raised and held above a critical temperature for a predetermined period of time. The workpiece is then quick-cooled below the critical temperature in a protected atmosphere such as a cracked natural gas atmosphere. After annealing or simply forging the part, the part may then be soft machined and teeth cut for a part such as a gear shown in the figures. The method and apparatus of the invention is particularly useful in machining of hardened parts having a hardness greater than Rockwell "C" 50. The part is subjected to a heat treatment process wherein it again is raised above a critical temperature and thereafter quenched in a suitable liquid in a known manner. The hardened workpiece is mounted on the centers of the turning machine via the central bores thereof, such that the workpiece is rotatable with respect to the non-rotating machine centers. The workpiece is thereafter rotated at a predetermined speed about a central axis, and is machined to form a finished part.

Figure 6:
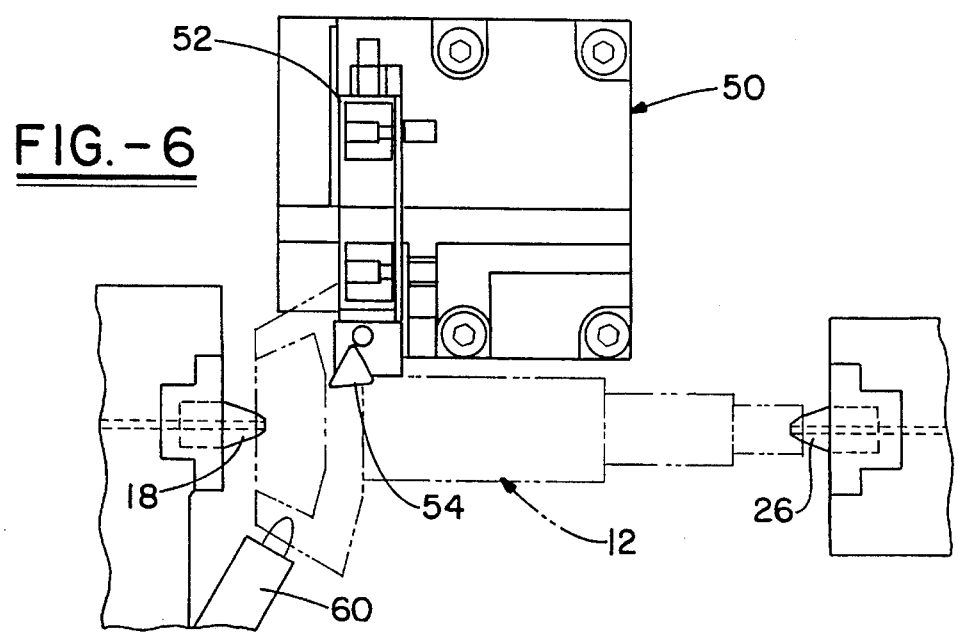
FIG. 6 shows a schematic top view of the turning machine.

In the foregoing method, the workpiece is hardened before machining, thereby requiring the use of ceramic or cubic boron nitride cutting tools to machine the workpiece. As shown in FIG. 6, an example of the turning machine may include one or more tool holders 50, each having one or more tools mounted thereon for machining of the part 12. For example, the tool holder 50 may include a first tool 54, which as shown in the figure is not engaged in a machining position with respect to the part 12. In operation, the tool holder 50 is brought into the predetermined position relative to workpiece 12 for machining of the part. Control of the tool holder 50 as well as control of the tool positioned on tool holder 50 is preferably performed by computer numerical control (CNC). The use of CNC equipment in association with the turning machine 10 allows repeatable, accurate results to be obtained in the machining process. Lubrication to the locating centers may also be automatically controlled in the machine.

The workpiece 12 is maintained in the proper position and alignment via the dead centers 18 and 26 of the type described, and the workpiece 12 is rotated by means of an outboard driving assembly 60 which engages and drives the workpiece 12 at high speeds on the non-rotating centers 18 and 26. The use of CNC and the improved dead centers 18 and 26 used in the turning machine 10 allow machining of hardened parts with greatly reduced runout to form final machined parts within specified tolerances and with a high degree of accuracy. For example, the non-rotating dead centers allow runout to be held to less than 0.0002 inches indefinitely. The use of dead centers further avoids problems with wear of beating sets used in association with live centers to allow such accuracy to be maintained over extended use of the machine. The machining of hardened parts will also reduce costs associated with fabrication of machined parts relative to a grinding process or the like.

Although the machining of particular workpieces such as hypoid gears have been described, it should be understood that the method and machine described herein may provide benefits in the machining of any hardened parts or where reduced runout is important. Although preferred embodiments have been described herein, various modifications would occur one of ordinary skill in the art, and are contemplated within the scope of the invention. The invention is therefore not to be limited by the described embodiments, but only as defined in the appended claims.

What is claimed is:

1. An apparatus to turn a workpiece for machining of the workpiece to form a finished part, comprising:
   a pair of non-rotating centers for supporting said workpiece along an axis, said centers formed with a curved outer surface over a portion thereof which engages a recess formed in said workpiece,
   said outer surface having an included angle such that said outer surface contacts said recess in a manner which minimizes frictional heating therebetween during machining, and
   means to rotate said workpiece at a speed which allows machining of said workpiece, wherein said non-rotating centers support said workpiece to minimize axial runout during machining thereof.

2. The apparatus of claim 1, wherein,
   each of said centers includes a passageway therethrough with a supply of a lubricant coupled to said passageway, "said passageway being positioned to allow", an amount of said lubricant to pass through said passageway to lubricate said portion of said outer surface contacting said recess to reduce friction therebetween.

3. The apparatus of claim 1, wherein,
   said portion of said outer surface which contacts said recess includes a coating of anti-friction material thereon.

4. The apparatus of claim 1, wherein,
   said outer surface of said non-rotating centers has an included angle of between 30°–50°.

5. The apparatus of claim 1, further comprising;
   at least one tool holder having at least one tool associated therewith, said at least one tool holder and at least one tool being movable into an operative position relative to the workpiece for machining thereof, and including means to control the movements of said tool holder and tool by computer control.

6. A method of forming a part by a machining process, comprising the steps of:
   (a) forming a workpiece from a material, said workpiece having two ends with each end including an unmachined recess therein for receiving a non-rotating tool center of a turning machine;
   (b) subjecting said workpiece to a hardening process whereby said material is hardened;
   (c) mounting said workpiece on said tool centers via said recesses, said workpiece being rotatable with respect to said non-rotating machine centers;
   (d) rotating said workpiece about an axis; and
   (e) machining the workpiece to form a finished part.

7. The method as in claim 6, wherein,
   said forming step comprises a forging process, which includes forging each of said recesses into a respective end of said workpiece.

8. The method of claim 6, further comprising the steps of:
   supplying a lubricant through said non-rotating tool centers during rotation of said workpiece thereon to reduce friction between said centers and said unmachined recesses.

9. The method of claim 6, further comprising the steps of:
   coating said non-rotating tool centers prior to said rotating step with an anti-friction means to reduce friction between said tool centers and said recesses during rotation of said workpiece thereon.

10. The method of claim 6, wherein,
    said step of machining said workpiece is performed by computer-controlled machining tools.

\* \* \* \* \*

UNITED STATES PATENT AND TRADEMARK OFFICE
CERTIFICATE OF CORRECTION

PATENT NO. : 5,527,400
DATED : June 18, 1996
INVENTOR(S): Roland C. Smith and James S. Fisher It is certified that error appears in the above-identified patent and that said Letters Patent is hereby corrected as shown below:

Title Page, item[54], and column 1, lines 2-4, the title should read as follows:

APPARATUS FOR MACHINING HARDENED PARTS

Signed and Sealed this

Eighth Day of October, 1996

*Attest:*

BRUCE LEHMAN

*Attesting Officer*     *Commissioner of Patents and Trademarks*